United States Patent
Ellin

[11] 3,942,076
[45] Mar. 2, 1976

[54] PHOTOGRAPHIC REMOTE SLAVE FLASH APPARATUS

[75] Inventor: Seymour Ellin, Chestnut Hill, Mass.

[73] Assignee: Polaroid Corporation, Cambridge, Mass.

[22] Filed: Dec. 26, 1973

[21] Appl. No.: 428,456

[52] U.S. Cl............. 317/80; 250/214 P; 431/95 R
[51] Int. Cl.² .......................................... H05B 37/02
[58] Field of Search.............. 95/11.5 R; 240/1.3; 250/200, 214 P; 315/323; 317/80; 431/95; 354/33

[56] References Cited
UNITED STATES PATENTS

| | | | |
|---|---|---|---|
| 2,272,102 | 2/1942 | Wildman............................ | 240/1.3 |
| 3,196,275 | 7/1965 | Atkins et al................ | 250/214 P X |
| 3,581,637 | 6/1971 | Harvey................................ | 240/1.3 |
| 3,598,984 | 8/1971 | Stomski............................. | 240/1.3 |
| 3,598,985 | 8/1971 | Harnden, Jr. et al................ | 240/1.3 |
| 3,601,652 | 8/1971 | Burnett, Jr. ................. | 250/214 P X |
| 3,618,492 | 11/1971 | Ellin.................................. | 95/11.5 R |
| 3,676,045 | 7/1972 | Watrous et al. ....................... | 431/95 |
| 3,699,861 | 10/1972 | Burgarella et al................. | 95/11.5 R |

Primary Examiner—J. V. Truhe
Assistant Examiner—Clifford C. Shaw
Attorney, Agent, or Firm—Gerald L. Smith; John W. Ericson; Edward S. Roman

[57] ABSTRACT

A remote flash slave apparatus for use in conjunction with a packaged linear array of flashlamps. The slave unit incorporates a solid state flashlamp selector circuit which is enabled or energized for only a limited period of time corresponding with the output interval of a typical flashlamp to preserve the integrity of the firing circuit. Additionally, the slave unit incorporates a feature providing for the avoidance of inadvertent cascading or firing of a series of flashlamps under a high steady-state light level environment.

7 Claims, 2 Drawing Figures

PHOTOGRAPHIC REMOTE SLAVE FLASH APPARATUS

BACKGROUND

A recent innovation in the field of flash photography has been the packaged linear flashlamp array. Developed for use with a highly automated camera, this flashlamp packaging arrangement is formed of two operational faces, each exhibiting an array of five flashlamps. When utilized in conjunction with a camera, a rapid succession of photographic cycles may be carried out without resort to mechanically indexing or aligning flashlamps following each exposure. As a consequence, cameras utilizing the array may be designed having a more convenient and compact size. Described in detail in U.S. Pat. Nos. 3,598,984 and 3,598,985, the dual arrays of flashlamps are compactly packaged by internesting the oppositely disposed flashlamps of each face thereof. The igniting terminals of individual lamps within the packaged arrays are connected by printed circuit technique to a downwardly extending blade mount, each side of which is configured to expose five input contacts and a common bus or lead. By inserting the downwardly extending blade mount within an appropriate mount or receptacle, electrical connection is made with the five input contacts of an outwardly or operationally facing array of the flashlamp and the noted common lead.

To ignite successive ones of those flashlamps within an appropriately oriented operational face of an array, flash firing circuits are incorporated. Typical designs for such circuits are those described in U.S. Pat. No. 3,676,045 and in application for U.S. Pat. by S. Ellin, Ser. No. 353,007, entitled "Flashlamp Signaling Circuit Employing Logic Signal Activation", filed Apr. 20, 1973, which, in turn, is a continuation-in-part of application Ser. No. 321,993, filed Jan. 8, 1973. For practical applications, these circuits are integrated structures capable of being triggered by low level logic or by pulse triggering. Inasmuch as the circuits are structured as "chip" modules, the period of their enablement or energization necessarily must be limited to prevent burn-out failures and the like.

In many photographic applications, for instance, portraiture, it is desirable to illuminate a subject from two directional aspects. For instance, a lighting source slaved to a camera mounted transient illumination source may be used to ameliorate background shadows or to provide highlighting effects and the like. Generally, such a slave unit requires cable connection to the flash synchronization firing system of the camera or incorporates a light responsive logic circuit to fire an auxiliary flashlamp in response to a witnessing of the light output of a camera mounted flash unit. In view of the convenience of the above-described linear array flash units, it is desirable that a slave unit be capable of accommodating such arrays by incorporating the above-described flash firing circuits. However, because of the unique structure of the units and the specialized demands imposed by their firing structures, such adaptation of remote slave units is not readily available. For instance, enablement of the firing circuits must be limited to a very short interval, for example, about 40 ms, to avoid chip burn-out. Further, should the device inadvertently be exposed to relatively high level steady-state illumination, as may be encountered at a sunny window, a firing circuit may react to rapidly and sequentially fire all lamps within a noted operational face. This effect is known as "cascading".

SUMMARY

The present invention is addressed to apparatus for igniting a flashlamp within a linear array thereof remotely from and in synchronism with the generation of illumination in the vicinity of a photographic camera or the like. The apparatus incorporates features providing for limited enablement of a flashlamp selector and firing circuit as well as a feature providing for the elimination or substantial minimization of chances of a cascading effect wherein a series of such flashlamps are illuminated in response to a higher level of steady-state illumination.

Another feature and object of the invention is to provide an apparatus including means mounting the linear array in an orientation for illuminating a scene and for witnessing transient illumination from a select remote scene illuminating source. The apparatus incorporates a flashlamp selector and firing circuit as well as a light detecting network having an output condition which responds to the noted remote transient scene light generation. A timing circuit is provided which responds to the output of this light detecting network output condition and converts a second output to a predetermined condition following a select interval of time. Preferably, this interval of time corresponds with the time output envelope of a typical flashlamp. A flash firing circuit is activated for firing a select flashlamp in response to the initial synchronized response of the timing circuit to light detection from the transient parent source. Through the timing network, however, enablement of the flash firing circuit only continues for the time interval normally associated with the period of illumination output of the transient source. For instance, this may be about 40 ms.

Another feature and object of the invention is to provide apparatus for igniting a select flashlamp within a linear array thereof in synchronism with the illumination of a scene from another transient source of illumination which may be rendered immune from cascading effects and the like which may occur when the device is inadvertently exposed to high level steady-state illumination as may be derived from sunlight or the like. With the arrangement of the invention, the timing circuit of the apparatus, operating in conjunction with a latch arrangement, maintains a post firing condition until such time as the entire apparatus is reset. Resetting may take place through the simple activation of an energy supplying switch.

Other objects of the invention will in part be obvious and will in part appear hereinafter.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
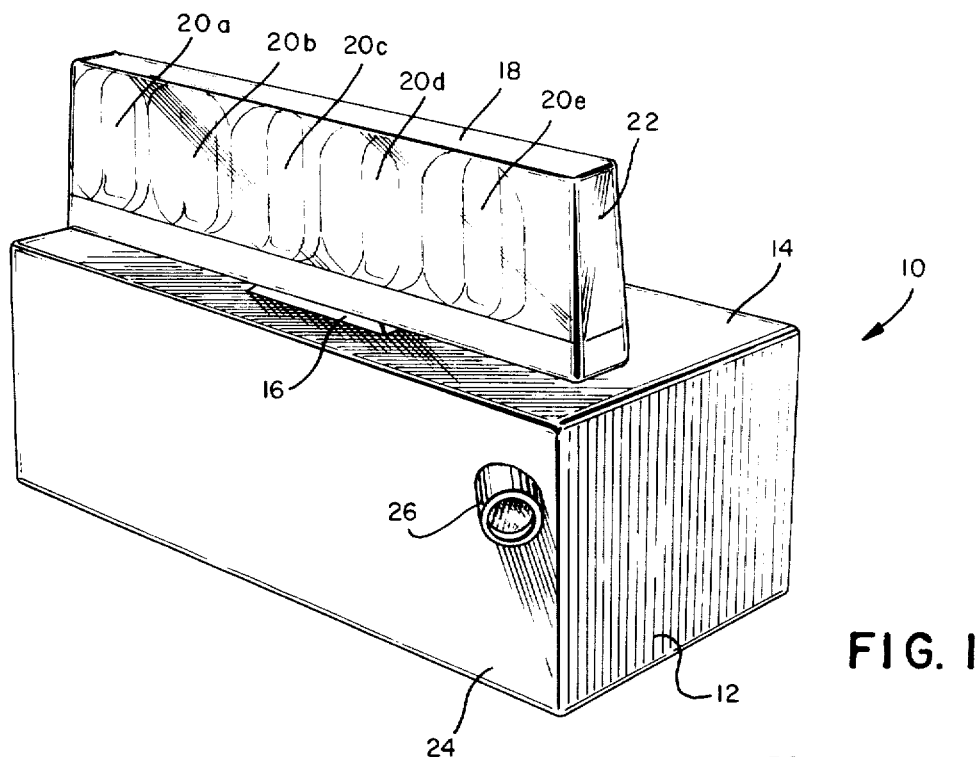
FIG. 1 is a pictorial view of a remote slave apparatus having a packaged linear flash array mounted thereon in operative position.

Referring to FIG. 1, one embodiment of the instant invention is revealed generally at 10. Apparatus 10 is formed as a generally rectangular housing 12 suited to be placed upon a supporting surface such as a table, stand or the like. On the top surface 14 of housing 12 there is formed a mount 16 adapted to receive the mounting blade or similar support structure of a packaged linear array 18. Array 18 may be structured as set forth in the above referenced U.S. Pat. Nos. 3,598,984 and 3,598,985. These arrays are formed having a downwardly extending blade mount (not shown) which has formed thereon by printed circuitry technique or the like a series of terminals each of which is connected with a photoflashlamp 20a – 20e along with a "common" terminal. The entire array of lamps 20a – 20e is packaged within a transparent outer covering 22. Folowing the expenditure of all lamps 20a – 20e, the array 18 is reversed and reinserted within socket or mount 16 to present a fresh supply of lamps internestably formed within the rear side thereof. The structure of mounting bracket or socket 16 provides for individual contact with each of the downwardly extending terminal surfaces emanating from lamps 20a – 20e as well as contacts adapted for connection with the common terminal and other logic devices as may be required for camera design. Such brackets are now well known in the art and are described in detail, for instance, in U.S. Patent Nos. 3,757,643; 3,745,895; 3,747,489; 3,748,980; and 3,748,985.

Formed in the forward face 24 of housing 12 are entrance optics 26 behind which are mounted a light sensing element utilized within the circuitry of the apparatus of the instant invention. Note that optics 26 are formed within face 24 in an oblique fashion. This arrangement is provided inasmuch as the device 10 is, for the most part, utilized in a "fill-in flash" capacity providing for the elimination of shadows behind a photographic subject as well as the provision of some highlights, for instance in portraiture. Because of the fixed geometrical mounting orientation of the array 18, in most photographic applications, it will be necessary for the array to substantially face away from the parent source or transient illumination. The oblique geometry of optics 26 accommodates for this orientation and simplifies light detection for the most frequently encountered photographic situations. With the arrangement thus described, remote slave apparatus 10 is positioned appropriately with respect to a subject being photographed, is turned on or enabled by a typical manually operated switch (not shown) and a flash illuminated photograph is made of the subject. Upon a light detecting element behind optics 26 detecting the initial brightness level rise from the parent transient source, a select one of flashlamps 20a – 20e will be energized to provide fill-in lighting and the like.

Figure 2:
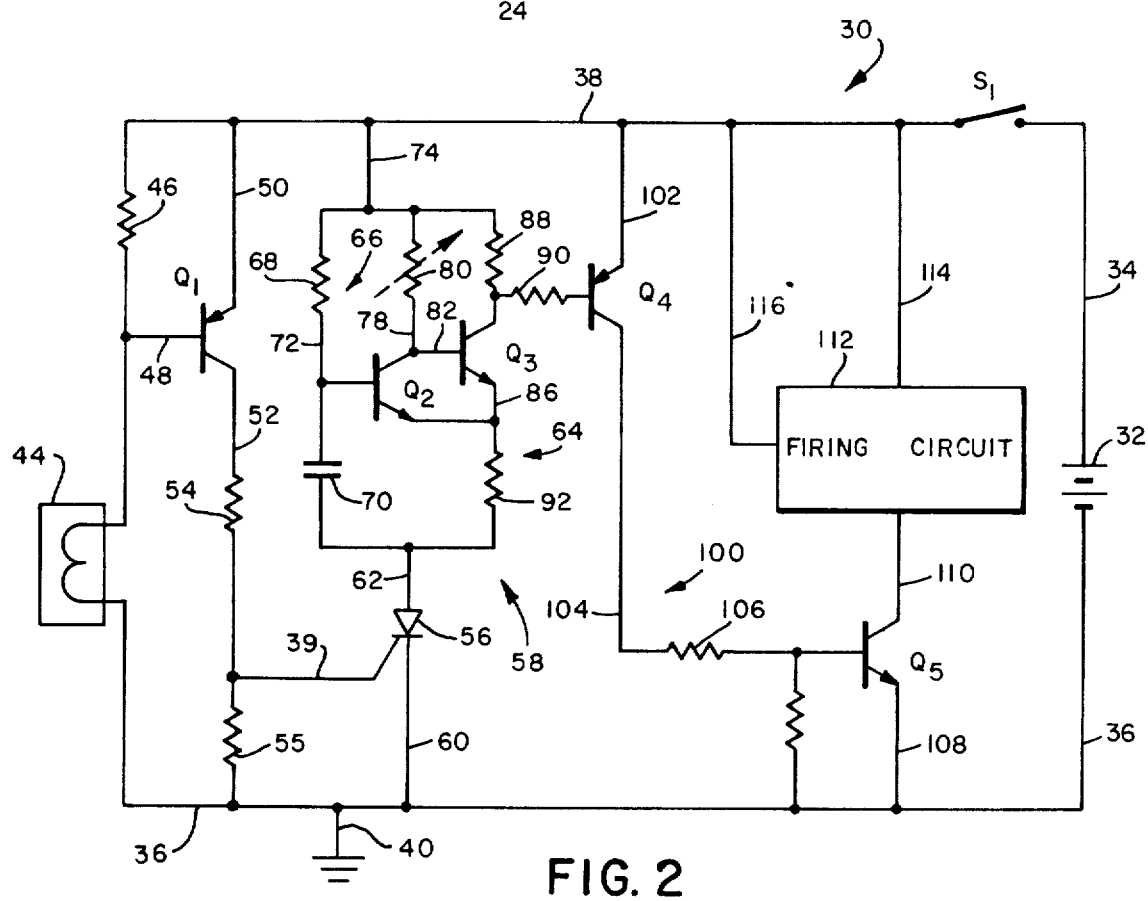
FIG. 2 is a schematic diagram of a control circuit used in conjunction with the apparatus of FIG. 1.

Referring to FIG. 2, a circuit arrangement for incorporation within housing 12 is revealed generally at 30. Circuit 30 incorporates a battery 32 connecting between power leads 34 and 36. Lead 34, in turn, is coupled through a manually operable switch $S_1$ serving the function as described above, the opposite side of the switch being coupled with power lead 38. Lead 36 is coupled to ground through line 40.

The light detecting network of circuit 30 is shown generally at 42 and includes a light responsive element 44 connected between lines 38 and 36. Element 44 preferably is one whose resistance varies inversely with the level of brightness witnessed thereby and may, for instance, be present as a cadmium sulfide cell. Element 44 is positioned, as noted above, behind entrance optics 26 in an orientation for responding to parent source derived transient illumination and in relative isolation from the output of lamps 20a – 20e. It will be appreciated, of course, that element 44 may be present as a light sensitive device having an electrical parameter which varies in some predetermined manner with levels of scene brightness impinging thereupon. Network 42 also incorporates a level adjusting resistor 46 and a PNP transistor $Q_1$. The base of transistor $Q_1$ is connected through line 48 to line 38 intermediate element 44 and resistor 46, its emitter is connected through line 50 to line 38 and its collector is coupled through line 52 and resistors 54 and 55 to line 36 at the opposite side of element 44. Accordingly, with the initial closure of switch $S_1$, transistor $Q_1$ will be forward biased in dependence upon the conductive state of photoconducting element 44. As a high level brightness of transient illumination is witnessed at cell or element 44, the resistance thereof drops to, in turn, permit the forward biasing of the base-emitter junction of transistor $Q_1$. In consequence, sufficient current is permitted to pass through line 39 to the gate input of an SCR 56 forming a component of a timing circuit represented generally at 58. SCR 56 is a gateable thyristor device having a latching characteristic. It is connected within timing network 58 such that its cathode side is coupled through line 60 to lead 36 and its anode is coupled through line 62 to one side of a timer network shown at 64. Network 64 is formed having an R-C network 66 formed of a timing resistor 68 and capacitor 70 within line 72. Line 72, in turn, couples through line 62, SCR 56 and line 60 to lead 36 and through line 74 to lead 38. The midpoint between resistor 68 and capacitor 70 is connected through line 76 to the base of NPN transistor $Q_2$, transistor $Q_2$ representing the input stage of a Schmitt-type trigger. The collector of transistor $Q_2$ is connected through line 78, resistor 80, lines 72 and 74 to lead 38 as well as through line 82 to the base of NPN transistor $Q_3$. The emitter of transistor $Q_2$ is coupled through lines 84 and 86 to provide a common emitter coupling with transistor $Q_3$. Transistor $Q_3$ forms the second or output stage of the trigger, its collector being connected through resistor 88, lines 72 and 74 to lead 38 as well as through limiting resistor 90 to the base of PNP transistor $Q_4$. The emitter of transistor $Q_3$ also is coupled through line 86, resistor 92 and line 62 to the anode side of SCR 56.

With the circuit arrangement shown, as SCR 56 is gated into conduction upon receipt of a light responsive gating signal at line 39, network 64 is powered, transistor $Q_3$ being forward biased to provide a continuing current supply sustanining the forward conduction of SCR 56. Transistor $Q_2$ is off at this time as R-C network 66 commences to time-out a predetermined interval, preferably selected in accordance with the energization period of a typical flashlamp. During this interval, transistor $Q_2$ is normally "off".

Transistor $Q_4$ forms the entrance stage of an enabling network represented generally at 100. The emitter of transistor $Q_4$ is coupled through line 102 to lead 38, while its collector is connected through line 104 and resistor 106 to the base of NPN transistor $Q_5$. The emitter of transistor $Q_5$ is connected through line 108 to lead 36, while its collector is coupled through line 110 to an enabling or energizing input of a flash firing circuit represented generally at block 112. The opposite energizing input to circuit 112 is provided at line 114, while its logic level firing signal input is provided at line 116 which, in turn, is coupled to power lead 38.

Firing circuit 112 may be of a variety as described in the above-noted U.S. Pat. Nos. 3,676,045 or 3,618,492. However, the circuit preferably assumes the configuration in the above-referenced application Ser. No. 353,007. While such circuits may assume a variety of configurations, in one configuration each flashlamp 20a – 20e is coupled with an SCR as a solid state switching device. The thus arrayed switching devices are implemented with a constant voltage drop sensing device and logic transistors which combine to require as conditions for gating a switching a device that the previous device be conducting and that the voltage across the preceding lamp terminals exceed a threshold voltage. The circuits may be actuated or fired by a logic level, for instance as would be derived at line 116 in FIG. 2. As an additional condition for firing a lamp, circuit 112 must be enabled or energized as through lines 114 and 110. It will be apparent that firing of a flashlamp may take place upon the completion of both prerequisite conditions. In the instant embodiment, this last condition will be seen to be that of enabling circuit 112 from line 110. Returning to enabling network 100, with the initial actuation of the circuit through the detection of a high brightness level at element 44, conduction at SCR 56 and, consequently, the forward biasing and conduction of transistor $Q_3$, transistor $Q_4$ is drawn into conduction or is forward biased. As a consequence, a forward bias is imposed at transistor $Q_5$ to complete an energization path including lines 108 and 110 into firing circuit 112. Accordingly, circuit 112 fires a selected flashlamp 20a – 20e, firing logic input being continuously applied from line 116 upon closure of switch $S_1$.

Following an interval of time preferably corresponding with the output envelope of a typical flashlamp, R-C network 66 achieves the threshold or forward biasing level of transistor $Q_2$. In consequence, transistor $Q_2$ conducts to rapidly remove the forward bias at transistor $Q_3$. As transistor $Q_3$ turns off, transistor $Q_4$ turns off to, in turn, effect the removal of forward bias at transistor $Q_5$. Circuit 112 then is de-energized so as to protect it from burn-out occasioned from lengthy periods of energization. With the removal of forward bias at transistor $Q_3$, the sustaining level of current admitted to SCR 56 diminishes, and the SCR latching function is terminated. In consequence, the circuit is shut down pending a next actuation.

Should a condition wherein slave unit 10 be subjected to steady state high brightness levels occur, it may be desirable to assure that no "cascading" or rapid sequential firing of all flashlamps 20a - 20e inadvertently take place. To accommodate for such situations, resistor 80 may be provided having a relatively low value of resistance or, as shown in phantom in the drawing, be provided as a variable resistor. Resistor 80 serves the function of adjusting the bias at transistor $Q_3$. Accordingly, should its value be lowered a predetermined amount, with the removal of forward bias at transistor $Q_3$ at the termination of a normal "time-out" interval of network 66, sustaining current maintaining the conduction at SCR 56 will be provided through line 78, now conducting forwardly biased transistor $Q_2$, resistor 92 and line 62. This forward conducting condition at SCR 56 assures that transistor $Q_4$ will remain "off" and the condition continues until such time as switch $S_1$ is opened. Accordingly, switch $S_1$ would serve a resetting function for the circuit.

Since certain changes may be made in the above-described system and apparatus without departing from the scope of the invention hereinvolved, it is intended that all matter contained in the description thereof as shown in the accompanying drawings shall be interpreted as illustrative and not in a limiting sense.

I claim:

1. Apparatus adapted for use with a source of electrical energy for igniting a select flashlamp within a linear array thereof in substantial synchronism with the illumination of a scene from another transient source of illumination, comprising:
    means for mounting said array in an orientation for illuminating said scene from said select flashlamp and including terminal means electrically connectable in igniting relationship with said flashlamps;
    firing circuit means for electrically activating the said terminal means associated with said select flashlamp in response to energization by a select input condition;
    light detecting network means for providing a select output condition responsive to illumination from said transient source;
    timing circuit means responsive to said light detecting network means select output condition and converting from a first output condition to a second output condition at a predetermined interval of time from its response to said light detecting network means output condition; and
    means responsive to said timing means first output condition for deriving said firing means select input condition so as to effect said electrical activation of said terminal means and responsive to said timing means second output condition for removing said firing means select input condition after said predetermined interval of time thereby facilitating the protection of said firing circuit means from damage occassioned from too long a period of energization by said select input condition.

2. The apparatus of claim 1 in which said timing circuit means includes:
    timer means for deriving said first and second output conditions when energized; and
    latch means responsive to said light detecting network means output condition for energizing said timer means from said source.

3. The apparatus of claim 2 in which said latch means is responsive to said second output condition to de-energize said timer means.

4. The apparatus of claim 2 in which said timer means includes:
    trigger circuit means having an output stage which assumes a conducting state to derive said first output condition and an input stage responsive to a predetermined triggering signal to convert said output stage to a non-conducting state representing said second output condition; and
    an R-C timing network responsive to said energization for developing said predetermined triggering signal at the termination of said predetermined interval.

5. The apparatus of claim 2 in which:
    said apparatus includes switch means actuable to assume a first condition enabling said apparatus to be energized from said source and having a second condition effecting the de-energization of said apparatus; and said latch means and said timing circuit means are configured to maintain said energization of said timer means in the presence of said second output condition and when said switch means is in said first condition.

6. The apparatus of claim 2 in which said latch means comprises a gateable thyristor device having a latching characteristic and coupled to energize said timer means from said source in response to gating by said light detecting network means output condition.

7. The apparatus of claim 1 in which said predetermined interval of time is selected in correspondence with the period of illumination output of said transient source.

* * * * *